(12) United States Patent
Akerman et al.

(10) Patent No.: US 6,999,078 B1
(45) Date of Patent: Feb. 14, 2006

(54) METHOD OF FORMING A PERSPECTIVE RENDERING FROM A VOXEL SPACE

(75) Inventors: Shmuel Akerman, Binyamina (IL); Gad Miller, Tel-Aviv (IL)

(73) Assignee: Algotec Systems Ltd., Raanana (IL)

(*) Notice: Subject to any disclaimer, the term of this patent is extended or adjusted under 35 U.S.C. 154(b) by 0 days.

(21) Appl. No.: 09/856,761

(22) PCT Filed: Nov. 26, 1999

(86) PCT No.: PCT/IL99/00639

§ 371 (c)(1),
(2), (4) Date: May 23, 2001

(87) PCT Pub. No.: WO00/33257

PCT Pub. Date: Jun. 8, 2000

(30) Foreign Application Priority Data

Nov. 27, 1998 (IL) .................................. 127314

(51) Int. Cl.
*G06T 17/00* (2006.01)

(52) U.S. Cl. ...................................... 345/424; 345/426
(58) Field of Classification Search ................ 345/424, 345/426, 581, 419, 421, 427, 501, 506, 634, 345/856; 424/9.42; 556/28
See application file for complete search history.

(56) References Cited

U.S. PATENT DOCUMENTS

| 5,201,035 A | 4/1993 | Stytz et al. |
| 5,381,518 A | 1/1995 | Drebin et al. |
| 5,417,958 A * | 5/1995 | Deutsch et al. ............ 424/9.42 |
| 5,499,323 A | 3/1996 | Doi et al. |
| 5,555,352 A | 9/1996 | Lucas |
| 5,557,711 A | 9/1996 | Malzbender |
| 5,566,282 A | 10/1996 | Zuiderveld |
| 5,568,811 A | 10/1996 | Olstad |
| 5,594,844 A | 1/1997 | Sakai et al. |
| 5,694,530 A | 12/1997 | Goto |
| 6,219,059 B1 * | 4/2001 | Argiro ........................ 345/424 |
| 6,297,799 B1 * | 10/2001 | Knittel et al. ............... 345/419 |
| 6,313,841 B1 * | 11/2001 | Ogata et al. ................ 345/424 |

FOREIGN PATENT DOCUMENTS

| EP | 0 362 123 | 4/1990 |
| EP | 0 442 682 | 8/1991 |
| FR | 2 662 524 | 11/1991 |
| WO | WO 98/47105 | 10/1998 |

OTHER PUBLICATIONS

Foley et al., Computer Graphics: Principles and Practice Second Edition in C, Addison–Wesley, 1996, Chapters 15–16, 18, 20.*

* cited by examiner

*Primary Examiner*—Mark Zimmerman
*Assistant Examiner*—Lance W. Sealey
(74) *Attorney, Agent, or Firm*—Fenster & Company

(57) ABSTRACT

A method for forming a high spatial resolution perspective rendering from a low spatial resolution voxel space is disclosed. The method comprises steps of: a) initializing a virtual window of predetermined resolution pixels, and placing the virtual window in or near the voxel space; b) sparsely ray-casting a plurality of vectors from a predetermined vantage-point through the virtual window into the voxel space; and c) calculating a visualization-value at a series of positions along each vector. In a position ordering of steps from the vantage-point to the pixel, an accumulated transparency-value threshold is calculated. Values of proximate voxels are interpolated into an interpolated voxel value for each position. The interpolated voxel values are then transformed into a derived visualization-value and transparency value.

52 Claims, 7 Drawing Sheets

METHOD OF FORMING A PERSPECTIVE RENDERING FROM A VOXEL SPACE

RELATED APPLICATION

This application is a U.S. national filing of PCT Application No. PCT/IL99/00639, filed Nov. 26, 1999, the disclosure of which is incorporated herein by reference.

FIELD OF INVENTION

This invention relates to a method for forming a perspective rendering from a space of volume elements (voxels). More specifically, this invention relates to a family of algorithmic optimizations, which are useful in the forming of a perspective rendering from a voxel space.

BACKGROUND OF THE INVENTION

Many quantitative disciplines collect or generate multi-dimensional data. These disciplines include medical imaging applications such as CT or MRI; geophysical modeling, meteorological forecasting, scientific simulations, animation models, and the like. This multidimensional data is often stored and manipulated in the form of voxels. Voxels are volume elements in three (or more) dimensions; and are analogous to pixels (two dimensional picture elements).

Professionals often find it useful to be able to visualize some aspect of voxel data. The visualization requires transforming the voxel data, so that a cross-section, a projection, or another form of visualization can be realized on a two-dimensional display device. Numerous visualization techniques have been explored, and most are unfeasible for application; by reason of computational complexities associated therewith. Nevertheless, there are certain basic desirable aspects of visualization standards for accepted renderings (representations).

The professional expects the visualization to facilitate elevated insights and to evoke increased understanding of the data. This is often accomplished by imposing (onto a rendering of the data) subjective criteria such as depth, shading, perspective, lighting, or shadowing; which are not necessarily generic to the data being rendered. For example, depth or shadow are not natural features of geophysical cross-sections; but may be helpful to the professional who is looking for ways to understand such a complex data set. Alternately, the professional may expect the visualization to be life-like (of realistic appearance).

The result of the professionals' rendering expectations and the computational complexity of accomplishing them has generated a cluttered convolution of rendering techniques. Some techniques have been developed which are specific to rendering certain data sets, while other techniques are seemingly more general in scope.

The nature of the prior art (of rendering a voxel space) can be better appreciated from studying U.S. Pat. No. 5,201,035, U.S. Pat. No. 5,499,323, U.S. Pat. No. 5,594,844, and from the prior art references cited therein. Furthermore, the order of complexity required for successful algorithmic optimization, in forming a perspective rendering from a voxel space, will thereby be appreciated.

The prior art is problematic and primarily application specific. Many overlapping combinations of more fundamental graphics algorithms are used in an attempt to simultaneously provide adequate rendering within algorithmic bounds that are economically and technically practical. Many examples of prior art methods are visually realistic but algorithmically heavy, and many other examples of the prior art are visually simplistic albeit algorithmically feasible. Thus, there is a need in the art for rendering methods that are simultaneously visually realistic and algorithmically practical.

SUMMARY OF TE INVENTION

The present invention relates to a method for forming a high spatial resolution perspective rendering from a low spatial resolution voxel space, the method including the steps of: (a) initializing a virtual widow of predetermined resolution pixels, and placing the virtual window in or near the voxel space; (b) from a predetermined vantage-point, sparsely ray-casting a plurality of vectors through the virtual window into the voxel space; (c) calculating a visualization-value for each ray-cast vector not having an associated visualization-value, and therein for each position in a step dependent series of positions on the vector, and in a position ordering of steps from the vantage-point through the pixel, until an accumulated transparency-value threshold is reached or until a last available voxel intersecting with the vector is reached—whichever is sooner, by: FIRSTLY interpolating values of proximate voxels into an interpolated voxel value for the position; SECONDLY transforming the interpolated voxel value into a derived visualization-value and transparency value; and THIRDLY, using a predetermined selection rule, accumulating the derived visualization-value with a value presently stored in the corresponding pixel; and (d) until every pixel has an associated visualization-value, selecting a pixel (P) not yet having a visualization value, and IF substantially nearest pixels to the selected pixel (P) have computed visualization-values that are statistically homogenous, THEN interpolating a visualization-value from these substantially nearest pixels, and assigning the interpolated visualization-value to the selected pixel (P), ELSE ray-casting a vector through the selected pixel (P) and assigning a visualization-value to the selected pixel (P) using step (c).

The present invention provides a feasible method, both visually and algorithmically, for forming a high spatial resolution image perspective volume rendering from a low spatial resolution voxel space. The data, to be rendered into a visualization, is represented in a three-dimensional array of volume elements (voxels). Since the data stored in the voxels is not necessarily of a format, magnitude, or distribution useful for representation (e.g. on a display device such as a TV screen, a plotter, or the like), a transformation step is required in order to conform the data to a form that may be presented on a display device. These classes are used to transform one or more ranges of voxel values to doublets of a transparency-value and a representation-value (e.g. RGB for color, or gray-level, or the like). Recall that transparency-value and opacity-value are inverse quantifications of the same visualization aspect, so it is only by convenience of conceptualization that the present invention is described according to transparency-values or opacity-value.

According to the present invention, some interpolations are done before voxel value to visualization value transformations while other interpolations are done after these transformations. Interpolation is one of the key tools used to render a high-resolution image from a lower resolution representation. There are many functions that have proven useful for performing interpolations. Interpolation computationally solves for a value at a selected position from two or more neighboring positions. Interpolation functions may even consider all known locations having data-values to solve for a single location whose data-value is sought. In general, interpolation functions can be ordered; either in the same sense as polynomials, or according to a measure of algorithmic-computational complexity.

The tradeoff between low-order interpolations (e.g. linear), intermediate-order interpolations (e.g. cubic or spline), and higher-order interpolations directly affects the visual smoothness of appearance for images wherein interpolations have been used to synthetically create values for locations where no such values existed in the original data. Even for intermediate-order interpolations, there is a large algorithmic expense.

Therefore, in visualization applications, normally low-order interpolations are used for solving at all interpolation-requiring positions, except for a most critical sub-set of positions, such as positions close enough to the eye (e.g. foreground objects and not backgrounds). Furthermore, switching between different order interpolations is noticeable, and requires some secondary compensatory mechanism—especially if the criterion is proximity to the eye. These special considerations, for preserving an appearance of smoothness, are especially important because—often an object of the visualization is to maintain the clear resolution of distinct class boundaries (in the form of continuous iso-surfaces of voxel-values—as explained below).

In the context of the present invention:
(i) An "iso-surface" is a manifold in space in which the interpolation function of the voxel values is constant.
(ii) A "class" is the region in space in which the interpolation function assumes values that belong to a predefined interval.

Therefore, by the continuity of the interpolation function, it follows that a class is bounded by the iso-surface(s) corresponding to the edge(s) of the class(s) interval. It should be appreciated that in the context of the present invention the iso-surfaces that are "interesting" with respect to processing are the class bounding iso-surfaces.

Another significant aspect in rendering a visualization of data relates to lighting. There are two basic types of lighting: surface lighting and volume lighting. Surface lighting occurs (is desired) when an external light source illuminates the surfaces of the classes. In the context of the preferred embodiment of the present invention, surface lighting originates from the same predetermined vantage-point as the "eye of the observer". By contrast, volume lighting derives from (is desired when) one or more voxels, in the "voxel space", are of themselves sources of illumination (radiant). In the context of several embodiments of the present invention, either surface lighting is used exclusively or volume lighting is used to complement surface lighting. According to one embodiment of the present invention, volume lighting is used exclusively.

Qualitatively, surface lighting values are proportional to the cosine of the angle formed between a vector connecting the eye and a point on an iso-surface and a normal to the iso-surface at that point; according to the embodiment where the light source is coterminous with the eye.

Qualitatively, volume lighting is proportional to the luminance (radiance) associated with one or more points in the voxel space, the distance between the luminescent point an the vantage-point (the eye), and the opacity (or equivalently but inversely—the transparency) of relevant voxels between the luminescent point an the vantage-point (the eye).

Qualitatively, opacity accumulates differently (between each voxel and the eye) according to the lighting model: surface, volume, or combination. In general, cumulative opacity represents the "Fraction of Light" ("FoL") (also referred to as "CT"—Cumulative Transparency) reaching the eye from a point in the voxel space; due to the light absorptive nature of the medium between the two (the eye and the point). Furthermore, it should be noted that the spatial precision necessary for successful rendering of surface lighting is significantly higher than that required for successful volume lighting.

According to the volume lighting model, luminescence (radiance) of the point is scaled (attenuated) by FoL by the time it reaches the eye. According to the surface lighting model, luminescence (radiance) of the eye is scaled (attenuated) by FoL*FoL by the time it completes the path of from the eye to point and back to the eye. Furthermore, the surface normal direction used in the surface lighting calculation for iso-surfaces is determined using any one of many well-known analytic estimates for a gradient (of the interpolated iso-surface).

Accumulating a transparency value into a pixel is by updating the present transparency value for the pixel: $CT^* = T^{current\ step\ size}$ (see FIG. 5); the present transparency value for the position on the vector exponentiated by the distance on the vector from the present position to the last position accumulated into the pixel; and the present transparency value for the position on the vector is a unit normalized transparency value.

A further significant aspect in "the process of volume rendering a visualization of data" relates to a well-known general technique called "ray-casting". Ray-casting substantially simulates a plurality of optical-information vectors that converge at the focal point of the eye. Equivalently, ray-casing simulates an algorithmic process wherein an accumulation of optical-information is organized with respect to a plurality of coterminous vectors; emanating outward from the eye. This algorithmic process enables a truncation of the vector (the cast ray) when the cumulative transparency of the traversed path becomes negligible.

According to the present invention, positions along the vector are selected for accumulating transparency values, and the step size between a present position and a next position is selected to be dependent on the opacity at the present position; albeit minimal and maximal step sizes limit the bounds of this proportionality. Furthermore, a change of class is detected by noting a change in opacity between two consecutive steps on a vector. Furthermore, according to the preferred embodiment of the present invention, in a region traversed by the vector having a high transparency the step size is large and in a region traversed by the vector having a low transparency the step size is small.

According to the preferred embodiment of the present invention, volume lighting contributions are produced everywhere, whereas surface lighting contributions are only produced when crossing from a class of lower opacity to a class of higher opacity. This crossing is at a surface that is facing the eye (a front surface), while a crossing from higher to lower classes of opacity is a "hidden" surface (a back surface). For example, in a medical data context if a vector traverses through a mucus and encounters a tissue, then this encounter is a front surface; while the continuation of the vector may pass again into a mucus and this "second passing" is a back surface.

According to the criteria (for interpolation) for preserving an appearance of smoothness in the rendering of continuous iso-surfaces, a high order of spatial precision is necessary whenever a front surface's surface lighting contribution (to the cumulative opacity of the ray-cast vector) is to be calculated. Therefore, according to the preferred embodiment of the present invention, whenever a front surface is detected between two consecutive steps—a smaller step-size search is performed between the two "consecutive steps". This search is in order to achieve a higher order of spatial positioning for a point on the front surface intersecting with the vector; and also for the normal to this point on the iso-surface.

Given the special significance of these front surfaces to the rendering process, an additional layer of processing is introduced. This processing is intended to substantially prevent a situation from occurring wherein two consecutive steps skip over a front surface without detecting it. Continuing in the medical context example, suppose there is a membrane (or thin film of tissue or a bone fragment, etc) in the mucus, that is tangential to the vector. Because the membrane is surrounded by transparent substance, the step size risks "jumping over" the membrane without detecting the existence of the membrane.

Therefore according to the preferred embodiment of the present invention, an opacity-perturbation operation ("opacification") is performed. This opacification process is intended to prevent jumping over front surfaces without detecting their presence. In the opacification process, a table (or equation) is prepared from which an opacity value can be assigned to each voxel value. According to this table (or equation), opacity for each voxel value is taken as the maximum value of a predetermined neighborhood with respect to the original voxel value. Furthermore, step size on the vector is according to this table. Because this table effectively flags regions wherein there may be a front surface, the step size on the vector is always reduced whenever the vector is passing in the region of a front surface; even if there is no actual intersection between them. The perturbed values from the table (or equation) are NOT used in the accumulation of a cumulative opacity; and are only used as a conservative strategy for properly optimizing (better choosing of appropriate) step sizes so as to achieve a visually acceptable rendering.

According to the present invention, another aspect in the process of volume rendering relates to selective ray-casting. As can be appreciated from the forgoing aspects of processes involved in volume rendering, each actual vector that is cast (from the eye), and by virtue of which opacity data is accumulated, causes a measure of algorithmic complexity to be added into the cost of a volume rendering. Furthermore, it should be appreciated that an object of the present invention is to produce a high spatial resolution perspective rendering from a low spatial resolution voxel space.

Recalling that the central tradeoff in volume rendering is to provide a feasible method (both visually and algorithmically), the preferred embodiment of the present invention is directed to minimizing the extent to which actual ray-casting is performed. According to a first approximation of this minimizing of ray-casting, a predetermined plurality of rays are cast.

According to one embodiment of the present invention, this predetermined plurality is distributed in a symmetric regular dispersion such that values for all intermediary rays can be interpolated from the cast rays without any additional ray-casting.

According to another embodiment of the present invention, intermediary rays are cast whenever the accumulated values from the heretofore cast rays are not statistically homogenous, and are otherwise interpolated.

According to a variation embodiment of the present invention, a first plurality of regularly distributed rays are cast; and in each region between these regularly cast rays a statistical homogeneity metric is computed. From these cast rays—EITHER values in the region are interpolated from neighboring cast-rays' values OR a next plurality of regularly distributed rays are cast in the region, and a next resolution metric is computed. This either-or processing is repeated UNTIL values for all rays in a desired spatial resolution of rays have associated values. This variation embodiment is an iterative zoom-in value filling process that uses, as appropriate, the previous embodiments of the present invention.

In general, the present invention can be defined as "A method for forming a high spatial resolution perspective rendering from a low spatial resolution voxel space". This method includes the four steps ("a" through "d") of:

(a) initializing a virtual window of predetermined resolution pixels, and placing the virtual window in or near the voxel space;

(b) from a predetermined vantage-point, sparsely ray-casting a plurality of vectors through the virtual window into the voxel space;

(c) (i) for each ray-cast vector not heretofore having an associated visualization-value;
   (ii) and therein for each position in a step dependent series of positions on the vector;
   (iii) and therein in a position ordering of from the vantage-point through the pixel;
   (iv) and therein until an accumulated transparency-value threshold is reached or until a last available voxel intersecting with the vector is reached—whichever is sooner;

calculating a visualization-value and storing this visualization-value into the vector's corresponding pixel; by:
   FIRSTLY interpolating values of proximate voxels into a interpolated voxel value for the position;
   SECONDLY transforming the interpolated voxel value into a derived visualization-value and transparency value; and
   THIRDLY, using a predetermined selection rule, accumulating the derived visualization-value with the value presently in the corresponding pixel; and (d) until every pixel has an associated visualization-value, selecting a pixel (P) having the initialization from step (a), and
   IF substantially nearest pixels to the selected pixel (P) have computed visualization-values that are statistically homogenous,
   THEN interpolating a visualization-value from these substantially nearest pixels, and assigning the interpolated visualization-value to the selected pixel (P),
   ELSE ray-casting a vector through the selected pixel (P) and assigning a visualization-value to the selected pixel (P) using step (c).

In relation to these four steps ("a" through "d"—above) and to the conditions and sub-steps therein, a few summary observations are worthy of note.

In step (a), according to the preferred embodiment of the present invention, the spatial resolution of the pixels is higher than that of a cross-section of voxels in the voxel space.

In step (b), if the vantage-point is far from the virtual window, then the rays cast through the virtual window will effectively be parallel each to another. Alternately, if the vantage-point is close to the virtual window, then the rays cast will effectively be approximating a divergent perspective; as subtended through the angle defined by the virtual window.

In step (c), all four conditions must be satisfied in order for the "calculating and storing" operation to be performed.

In step (c) condition (i), note that vectors are cast in step (b) and also in step (d) (at the "ELSE" sub-step).

In step (c) condition (ii), the "calculating and storing" are independently done for each position on the vector.

In step (c) condition (iii), there are two possible orderings in ray-casting. These orderings depend on whether the virtual window is between the voxel space and the vantage-point (as is the case for the present description); or equivalently whether the voxel space is between the vantage-point and the virtual window. The expression of "from the vantage-point through the pixel" is a convenient choice of nomenclature, which is not intended to exclude any equivalent logically consistent ordering. For example, if the virtual window were to be placed in the midst of the voxel space or if the vantage-point were to be placed in the midst of the voxel space, then there would be optional orderings such as:

From the vantage-point to the virtual window.

From the vantage-point through the virtual window.

From the virtual window away from the vantage-point.

From the virtual window to (or through) the vantage-point

From the end of the voxel space to the window.

From the end of the voxel space to the virtual window; and thereafter to (or through) the vantage-point.

In step (c) condition (iv), "whichever is sooner" relates to accumulating transparency until further accumulation will not effect the visualization or until there is no further data to effect the visualization. Furthermore, "transparency threshold" is a lower bound (or if stated equivalently—to an opacity threshold that is an upper bound).

In step (c)"FIRSTLY", there are numerous methods for accomplishing the interpolation.

In step (c) "SECONDLY", the transforming is according to the representation that is desired on a display device. Should the transforming be for interfacing with further image processing, then the transforming is according to the values appropriate to that processing.

In step (c) "THIRDLY", the accumulating is according to a lighting model such as the surface lighting model, the volume lighting model, a combination of these two lighting models, a lighting model wherein the illumination source is not coterminous with the eye, or the like.

In step (d), it should be recognized that if the sparse ray-casting of step (b) is sufficient (as might be the case when implemented using parallel processing on the order of a processor per cast ray), then the supplemental ray-casting of the "ELSE" sub-step may never occur. This is not particularly problematic given the visual and algorithmic considerations motivating the method of the present invention.

It should also be appreciated that when there is a regular distribution of cast rays through the virtual window (in step (d) or even if done directly from step (b)) and when this distribution describes a spatial resolution in the virtual window that is higher than the spatial resolution of a cross section of the voxel space, then step (d) is expected to reduce to "selecting" and "interpolating" substantially without any further "ray-casting".

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
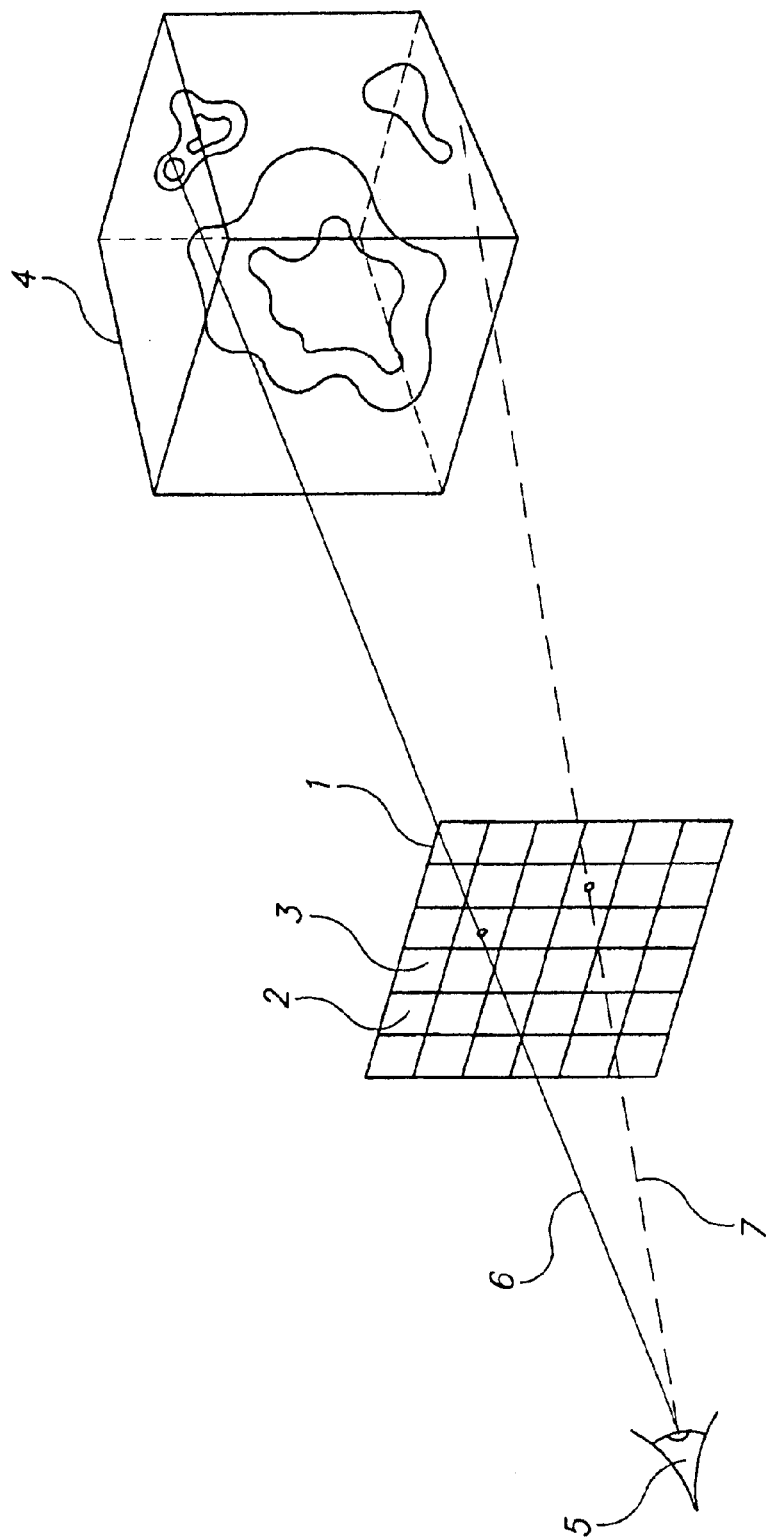
FIG. 1 is a schematic diagram of ray-casting geometry.

The present invention relates to a method for forming a high spatial resolution perspective rendering from a low spatial resolution voxel space. (Turning to FIG. 1, which is a schematic diagram of ray-casing geometry. This geometry is a typical geometry that is used in many embodiments of the present invention.) The method includes the four steps of:

(a) Initializing a virtual window (1) of predetermined resolution pixels (2) (3), and placing the virtual window in or near the voxel space (4). These pixels are logical storage elements corresponding to coordinates or regions of the virtual window. Normally, there is a simple and direct transformation from the geometry of the pixels of the virtual window to a display device (e.g. CRT, LCD, plotter, etc.).

(b) From a predetermined vantage-point (5), sparsely ray-casting a plurality of vectors (6) (7) through the virtual window into the voxel space. (Turning to FIG. 2, which is a schematic mapping of a ray-casting ordering on a virtual window. For example first casting rays through the pixels marked "X", then casting rays through the pixels marked "O", and finally casting rays or interpolating for the unmarked pixels—as in step (d) below.)

Figure 3:
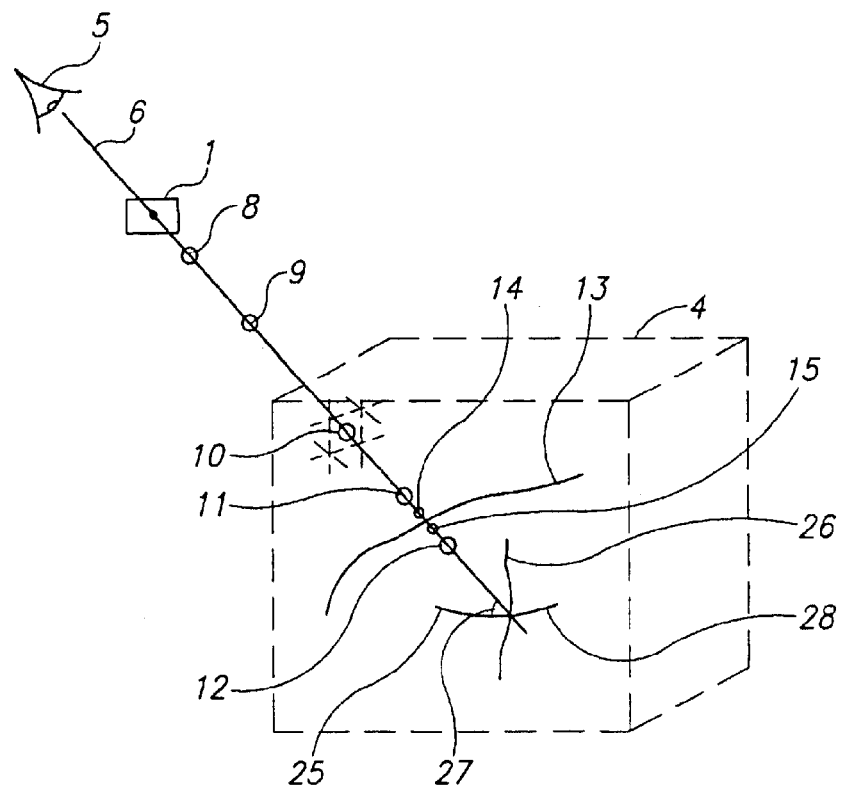
FIG. 3 is a schematic diagram of a search on a ray for an iso-surface.

(c) (Turning now to FIG. 3, which is a schematic diagram of a search on a ray for an iso-surface) For each ray-cast vector not heretofore having an associated visualization-value, and therein for each position in a step dependent series of positions on the vector (for example (8) (9) (10)), and therein in a position ordering of from the vantage-point through the pixel, and therein until an accumulated transparency-value threshold is reached or until a last available voxel intersecting with the vector is reached—whichever is sooner; calculating a visualization-value and storing this visualization-value into the vector's corresponding pixel; by: FIRSTLY interpolating values of proximate voxels into an interpolated voxel value for the position (for example from voxels in the neighborhood of position (10) on the vector); SECONDLY transforming the interpolated voxel value into a derived visualization-value and transparency value; and THIRDLY, using a predetermined selection rule, accumulating the derived visualization-value with the value presently in the corresponding pixel.

(d) Until every pixel has an associated visualization-value, selecting a pixel (P) having the initialization from step (a), and IF substantially nearest pixels to the selected pixel (P) have computed visualization-values that are statistically homogenous, THEN interpolating a visualization-value from these substantially nearest pixels, and assigning the interpolated visualization-value to the selected pixel (P), ELSE ray-casting a vector through the selected pixel (P) and assigning a visualization-value to the selected pixel (P) using step (c). According to many voxel space-rendering applications, statistically homogenous is measured with respect to computed values stored in pixels or with respect to depth factors associated therewith. (In this context "depth factors" relate to the distance from the eye to the position on the ray in which the ray casting was terminated, due to reaching the transparency value threshold or reaching the end of the voxel space.)

According to the preferred embodiment of the method of the present invention, a next position in step (c), in the (transformed—see step (c) "SECONDLY") step-dependent series of positions along the vector, is selected using a variable step size from a present position; and the variable step size depends on an associated transparency for the transparency value of the present position. For most applications the step size increases with the transparency. Nevertheless there may be applications wherein the visualization of the transparent portions of the transformed voxel space is the important aspect of the rendering.

According to most embodiments of the present invention, the step size from the present position to the next position is never greater than a voxel cross-section for the voxel space. This maintains that the ultimate visual quality of the image (being captured in the pixels of the virtual window for eventual display on a display device of media) will not be less than the spatial resolution of the voxel space.

According to another embodiment of the present invention, a first present position (of the transformed step-dependent series of positions) along the vector is at the pixel corresponding to the vector. This is equivalent to disregarding any portion of the voxel space that is between the vantage-point and the virtual window. According to the preferred embodiment, the first present position is at the eye (vantage point).

According to the preferred embodiment of the present invention, every next position (of the transformed step-dependent series of positions) is tested such that IF a (interpolated) voxel-value class iso-surface (as heretofore defined) has been detected along the vector between the next position and the present position, by virtue of the indication that the transparency value of the next position is smaller than that of the present position, THEN at least one position between the present and next positions is examined to provide a higher spatial resolution positioning for the iso-surface. For example in the series of position on the cast ray in FIG. 3, positions (11) and (12) are on opposite sides of an iso-surface (13). If the computed visualization value for position (12) is greater that that computed at position (11) then the front facing portion of the iso-surface has been traversed by the cast ray. This constitutes the detection of a class iso-surface.

Proceeding (for example with a search) back to test a position (14) and forward to a position (15) will increase the precision of the contribution by the iso-surface to the visualization value. Stated more formally, between firstly the at least one position and secondly either the present or next positions, a further at least one position is examined to provide a higher spatial resolution positioning for the iso-surface. Furthermore, further examinations of positions are performed until a predetermined precision is achieved in locating the detected iso-surface.

According to an alternate embodiment of the present invention, every next position (of the transformed step-dependent series of positions) is tested such that IF a class iso-surface has been detected along the vector between the next position and the present position, by virtue of the indication that the transparency value of the next position is smaller than that of the present position, THEN a position between the present and next positions is assigned as the location for the detected iso-surface.

Another optional enhancement which is applied to embodiments wherein iso-surfaces are detected relates to a visualization-value for the detected iso-surface being applied to the vector's associated pixel (by finding a normal (25) to the iso-surface (26) at the vector intersection point or equivalently) using a contiguous gradient to the vector iso-surface intersection location or from proximate elements of the intersection. This is applied by calculating a current surface lighting contribution to the cumulative visualization-value, and accumulating this surface lighting visualization-value into the pixel. The surface lighting contribution is the visualization-value at the intersection position multiplied by the cosine of the angle (27) formed by the vector and the normal to the iso-surface at that location (28); and multiplying that by the cumulative transparency (accumulated in the associated pixel) squared.

According to the preferred embodiment of the present invention, an interpolated voxel value is calculated for a position along the vector from proximate voxels: using cubic interpolation for a position close to the vantage-point, or using linear interpolation for a position far from the vantage-point, or using a distance dependent graded mixture of cubic and linear interpolation for a position of a predetermined intermediate distance from the vantage-point. This is the preferred embodiment since the calculations are simple, the results are smooth and visually continuous, and the weighting of algorithmic efforts is high precision for close positions to the eye with a smooth decrease of precision as the position is further from the eye. Equivalently, any interpolation function, which traverses smoothly from high order precision for close positions to lower order precision for more distant position, is acceptable.

It should be appreciated that transparency values are unit normalized ("specific transparency"). In other words, the transparency values at each location denote the transparency corresponding to a "slab" of unit thickness. Usually the step size is not of a unit length. Therefore to calculate the transparency for the volume traversed by this step (interval), the unit normalized transparency value is exponentiated by the actual step size. Accumulating a transparency value into a pixel is by: multiplying the transparency value of the pixel by the transparency value for the interval. According to the present invention, the predetermined selection rule of accumulating in step (c) includes a front surface detection and a surface-lighting. Furthermore, according to the preferred embodiment of the present invention, selecting a next position in the step dependent series of positions is coordinated with an opacification process.

Figure 4:
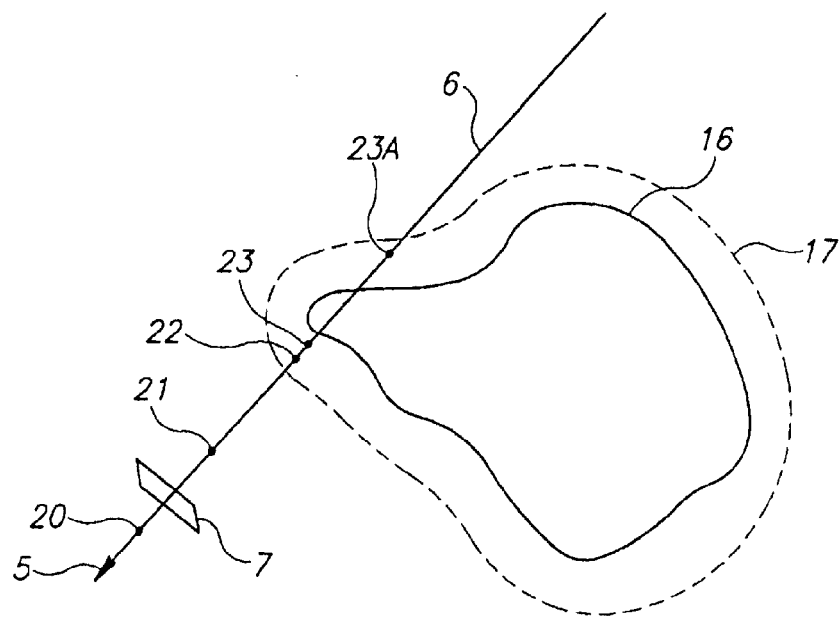
FIG. 4 is a schematic diagram of a ray cast near an opacified iso-surface.

According to the preferred embodiment of the present invention, class iso-surfaces are opacificied to facilitate a higher probability of detection. (Turning to FIG. 4, which is a schematic diagram of a ray cast near an opacified iso-surface.) The opacification is performed by stretching the intervals defining the classes, where the more opaque classes take precedence. This has the effect that the iso-surfaces are shifted (inflated) from their actual location outward (to enclose less opaque regions). Iso-surfaces (16) has been opacified into expanded surface "buffers" bounded by iso-surface (17). On the cast ray (6), steps (20), (21) and (22) occur at regular intervals along the ray. At position (22) an opacity increase is detected because of the opacification. Therefore, the step size to (23) is reduced and the actual class iso-surface (16) is more likely to be detected. If the opacification were not performed, then the step after (22) would be at position (23A). Since position (23A) is in a region of transparency like that of position (21), the iso-surface would not have been detected without the opacification.

Figure 5A:
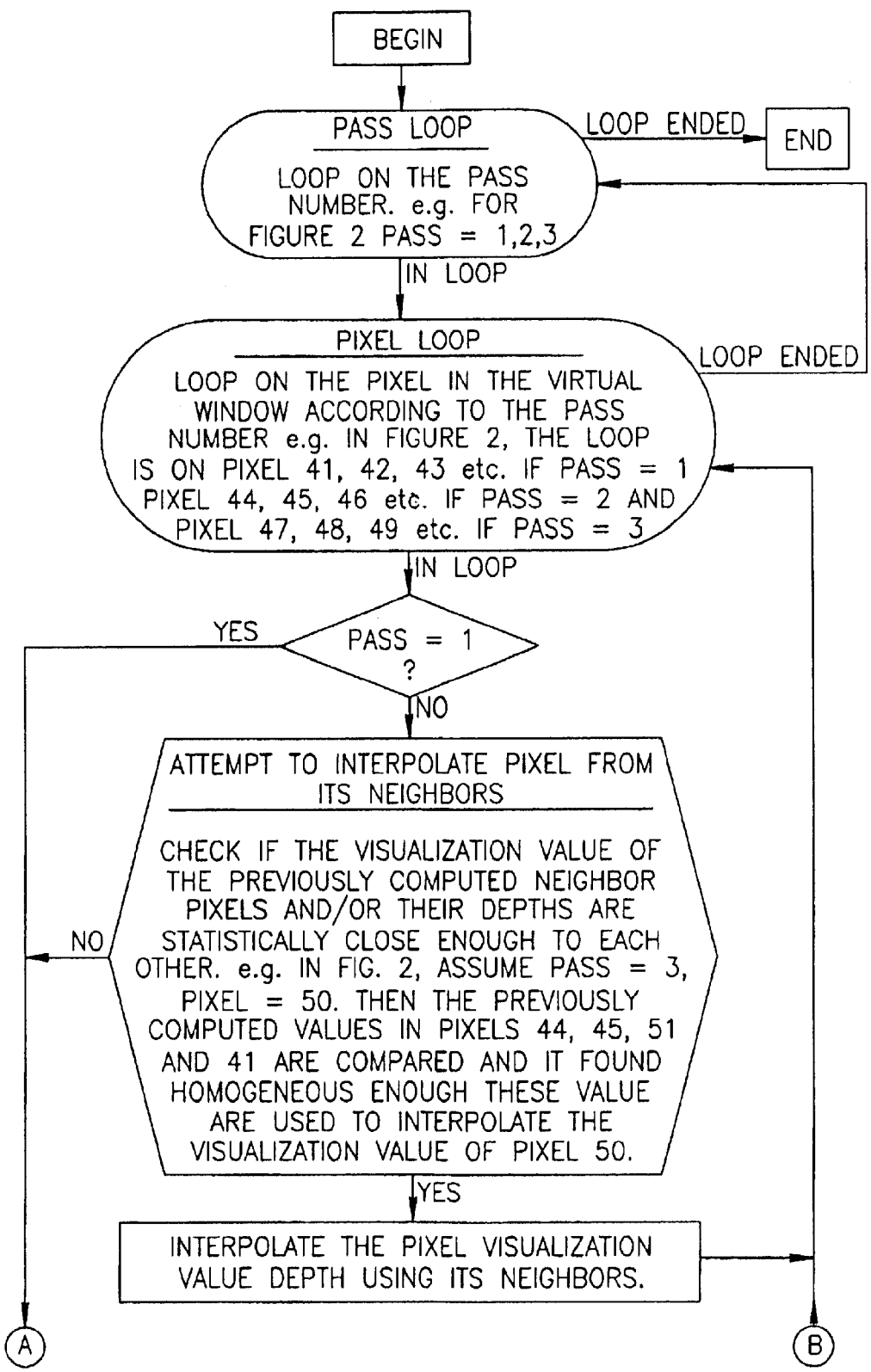
FIG. 5 is a flowchart summarizing the basic logic process of the present method.
Figure 5B:
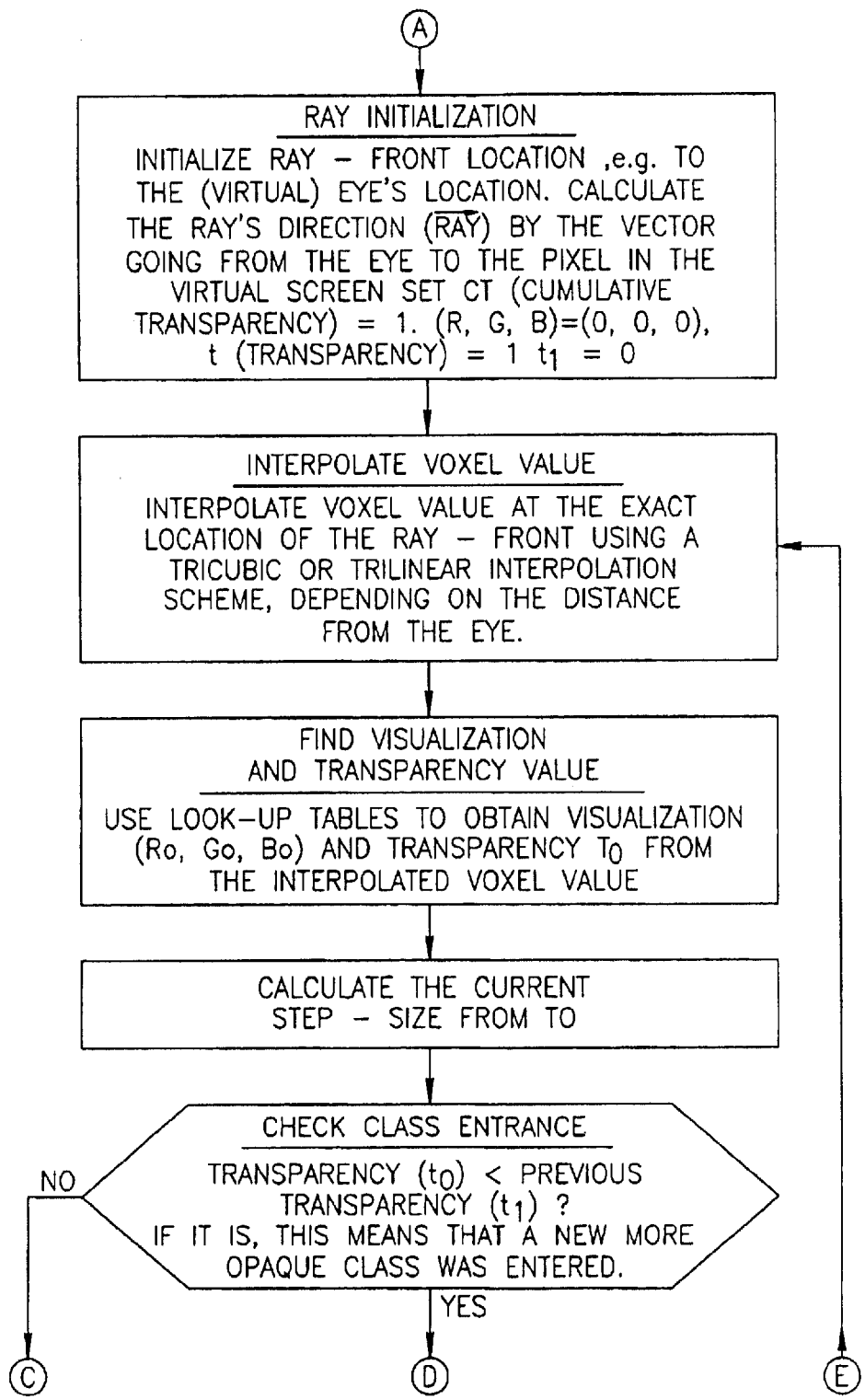
Figure 5C:
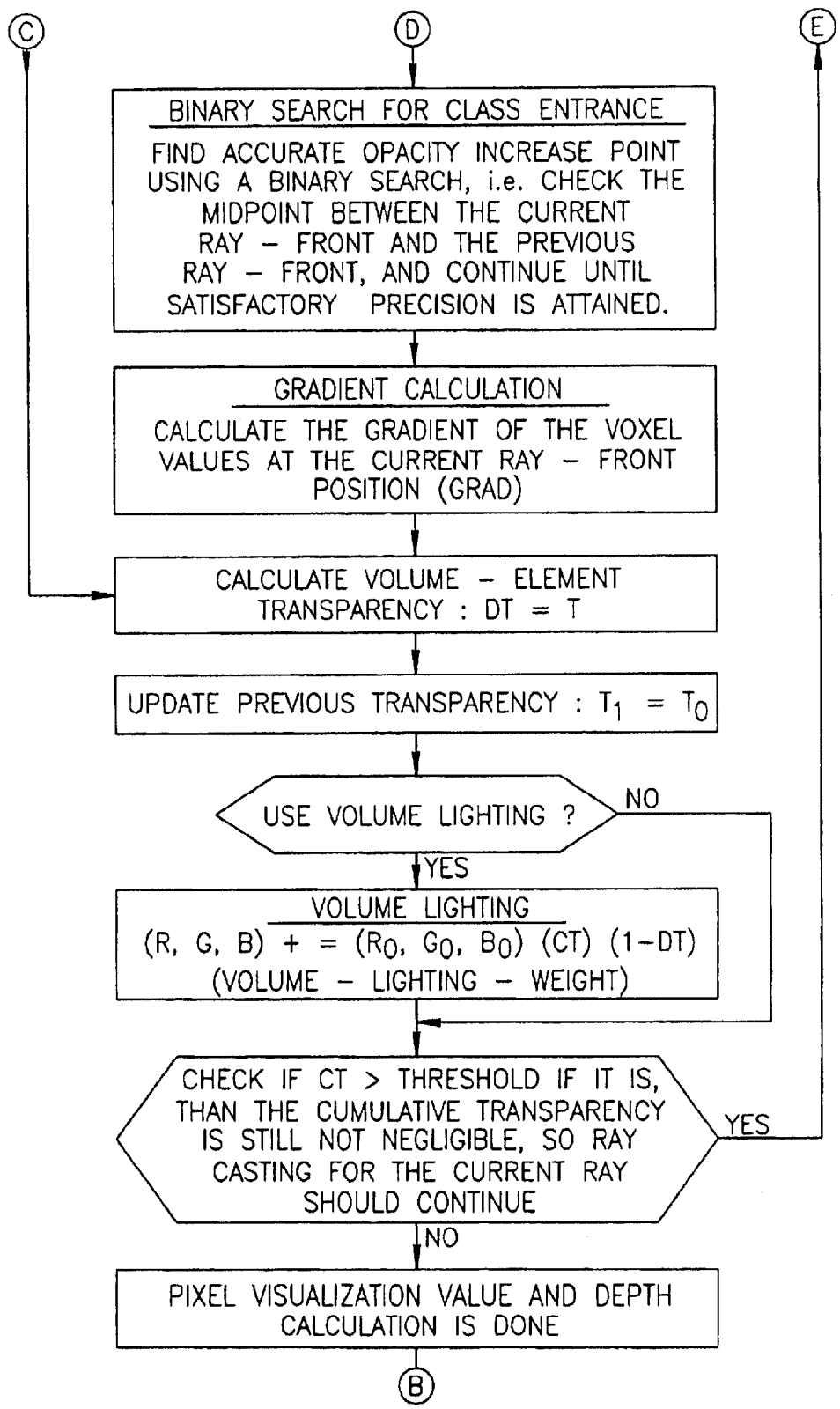

According to another embodiment of the present invention, the predetermined selection rule of accumulating in step (c) includes a volume-lighting (see FIG. 5).

According to further embodiments of the present invention, implementation of the method will be accomplished in parallel. According to one embodiment, step (c) is executed in parallel, by processing for the "each ray-cast vector of any more than one ray-cast vectors requiring the processing of step (c). This may result in allocating a processor (for effecting the algorithm of step (c)) to each cast ray. According to another embodiment, step (d) is executed in parallel; by processing for the each ray-cast vector of any more than one ray-cast vectors requiring the processing of step (d). Likewise, this may result in allocating a processor (for effecting the algorithm of step (d)) to each cast ray.

According to the preferred embodiment of the present invention, in step (d), "selecting" of pixels is ordered for progressively generating nested levels of resolution at the virtual window. This selecting may be as described in FIG. 2, or in quad-tree fashion, or by simulated zoom (or pan), or the like.

According to the preferred embodiment of the present invention, each transparency value is associated with a visualization-value for representation on a graphics display device. Furthermore, the representation is for associated color or gray levels.

In general the present invention is amenable for adaptation to numerous geometric permutations. According to the preferred embodiment of the present invention, a center surface region of the virtual window is placed perpendicular to an orientation vector from the vantage-point; and the orientation vector is an average of the plurality of vectors. Furthermore, the virtual window is planar. Alternately, the virtual window is curved or warped. Likewise the pixels are preferentially arranged in the virtual window as a uniformly spaced rectangular grid. However alternatively, the pixels are arranged in the virtual window using circular coordinates, elliptic coordinates, or another conic projection of coordinates.

The method of the present invention, according to the preferred and the basic embodiments is directed to rendering the voxel space contains data derived from a Computer Tomographic (CT) scan, Magnetic Resonance Image (MRI), an ultrasound scan, a Nuclear Magnetic Resonance (NMR) scan, a geophysical survey, a meteorological survey, a scientific simulation, an animation from a model having more than two dimensions, or a set of simultaneous equations.

Accordingly, in the preferred embodiment of the present invention, the virtual window; having calculated, interpolated, or accumulated visualization-values stored in the pixels thereof; is rendered onto a display device.

Figure 2:
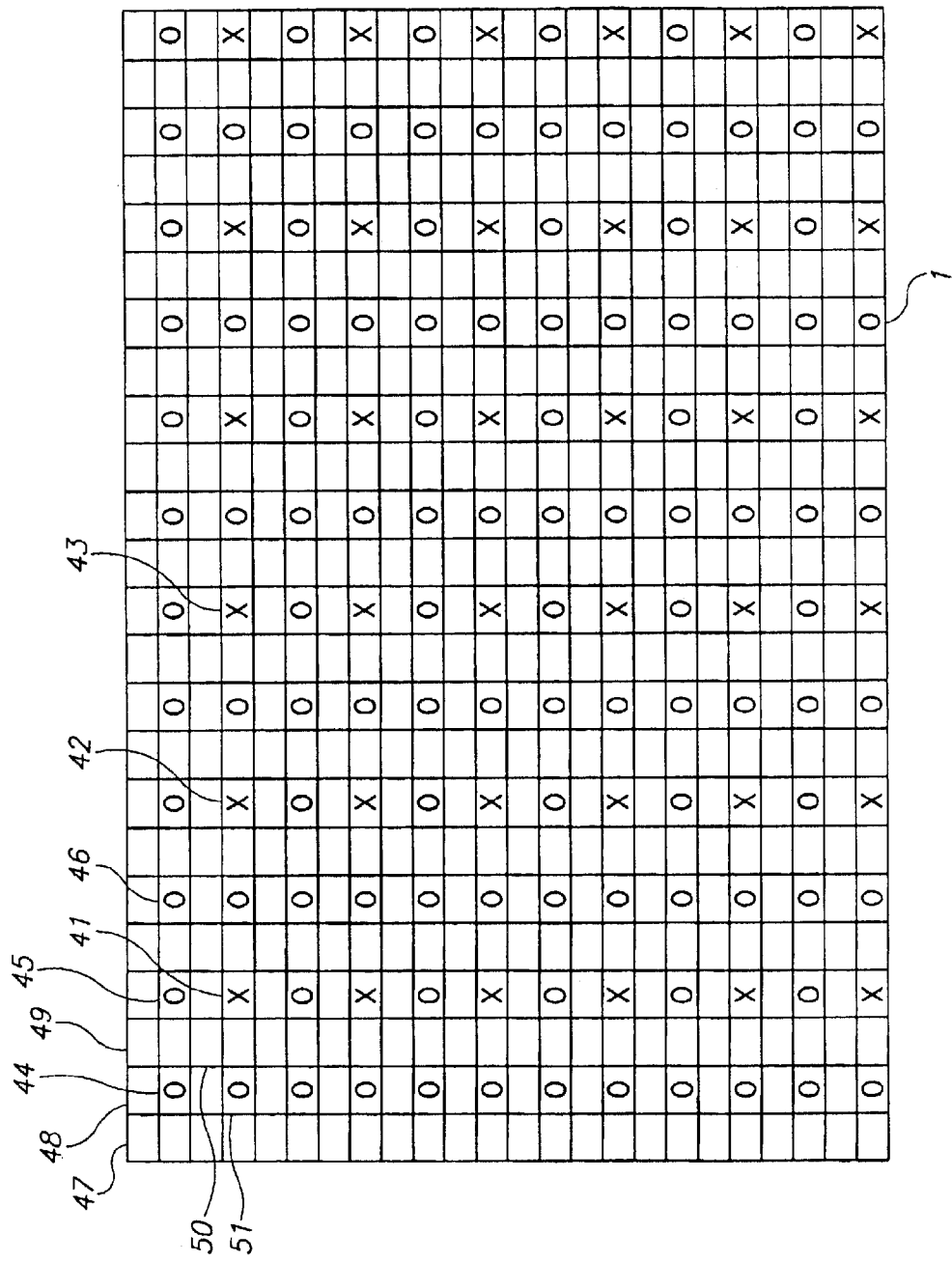
FIG. 2 is a schematic mapping of a ray-casting ordering on a window.

(Turning now to FIG. 5 which is a flowchart summarizing the basic logic process of the present method.) The follow notes are helpful in further understanding the detailed implementation of the present invention:

"pass" denotes the iteration "phase", as measured from sparsely cast rays to higher resolution ray casting (or interpolation in the virtual window) to complete filling of the virtual window (as in step (d))—(also see FIG. 2).

"pixel" denotes one or more data storage "values" corresponding to a location or region of the virtual window.

"CT" denotes cumulative transparency.

"(R, G, B)" denotes the red, green, and blue components of the visualization value.

"T" denotes transparency value.

"X+=Y" denotes X is replaced with X+Y.

"X*=Y" denotes X is replaced with X*Y.

The method of the present invention has been described with a certain degree of particularity with regard to ordering of steps, sub-steps, conditions, equivalents, and the like. This degree of particularity is not intended to limit the scope or spirit of the present invention, and is presented only for the purpose of conveying to those versed in the art such information as is necessary to properly appreciate the present invention and enabled embodiments thereof.

Figure 6:
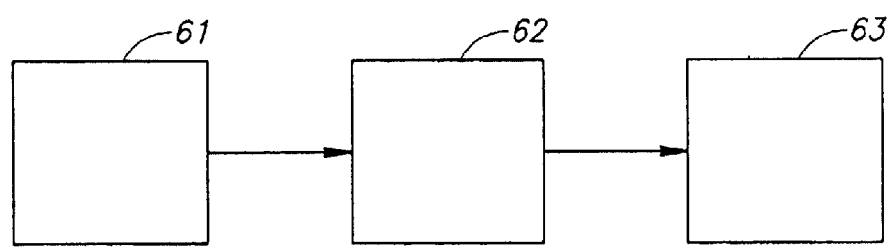
FIG. 6 is a schematic diagram of a computer system for forming a perspective rendering from a voxel space.

The present invention also relates to a computer system for forming a perspective rendering, from a voxel space. (Turning now to FIG. 6 which is a schematic diagram of a computer system for forming a perspective rendering from a voxel space.) This system includes:

a first memory media (61) wherein a voxel space is stored or represented;

a computer processor (62) having data communications with the first memory media and with a second memory media, and the processor forms a virtual window of visualization pixels from a ray-casting into the voxel space, wherein the forming is according to the method for forming a high spatial resolution perspective rendering from a low spatial resolution voxel space, substantially as herein-before defined and illustrated; and the second memory media (63) wherein the virtual window of visualization pixels is stored or represented.

The preferred embodiment of the present invention also relates to generating an index mapping of the homogeneity of the voxel space and to consulting this index mapping in order to decide if an interpolation computation is required— as part of the process of interpolating values of proximate voxels (step "c" FIRSTLY). For example, in order to further speed-up the process of ray-casting (with no penalty in image quality), an additional data-type is used, referred to as a BIT-VOLUME. In this data-type there is a single bit corresponding to each voxel. There are two variations in which a bit-volume may be used to facilitate ray-casting:

$1^{st}$ variation—Per class definition, the bit-volume is prepared (once) so that a value of 1 to a bit indicates the fact the a 4×4×4 cube of voxels (beginning with the voxel corresponding to that bit and extending to the positive sides of the x, y and z axes) belong to a single class.

During ray-case, when reaching a new position along the ray, the coordinates of the 4×4×4 cube of voxels needed for the cubic-interpolation of this position is calculated. Then, the value of the bit in the bit-volune corresponding to this cube (denoted by x) is queried.

a If x=0 then the interpolation (cubic or linear, depending on the distance from the eye as detailed above) proceeds as usual.

b Else (if x . 1) then
 i. If the previous position (the interpolated value of which was sought) also had x=1, then the previously found interpolated value is also taken as the current interpolated value.
 II. Else (if the previous position had x=0), the value of the interpolation is taken as an SINGLE voxel in the 4×4×4 cube of voxels.

Note that the interpolated value will be wrong. To see why this procedure works properly observe that for the algorithm to work properly (when visualization value is constant per class) it is sufficient for the used interpolated value to belong to the correct CLASS. Its exact value is inconsequential.

A sufficient condition that is easily met for which this correct-class-property holds in the above-described procedure is that the interpolated value always lies between the smallest and largest value used as input for the interpolation. Since a class is defined by an interval, and if all the inputs to the interpolation belong to the interval, then an interpolated value lying between the smallest and largest inputs must also belong to the interval and thus belong to the same class.

$2^{nd}$ variation—being similar in concept to the $1^{st}$ variation—
Per class definition, the bit-volume is initialized so that all bits are 0. In a similar fashion to the first variation, a value of 1 to a bit indicates that the 4×4×4 cube of voxels corresponding to that bit is known to belong to a single class. A value of 0 indicates that the class situation in the 4×4×4 cube is unknown or that they do not belong to a single class. Since at first nothing is known, the bit-volume is initialized to a constant 0.

During ray-cast, when reaching a new position along the ray, the coordinates of the 4×4×4 cube of voxels needed for the cubic-interpolation of this position is calculated. Then, the value of the bit in the bit-volume corresponding to this tube (denoted by x) is queried.

a. If x=0 then the interpolation (cubic or linear, depending on the distance from the eye as detailed above) proceeds as usual. If a cubic interpolation is performed, then the appropriate 4×4×4 cube of voxels used for the interpolation are checked and if found to belong to a single class, the corresponding bit in the bit-volume is set to 1. Note that since these voxels are used in the interpolation anyway, this check does not imply a big overhead.

b. If x=1 then the algorithm proceeds exactly as in way 1.

What is claimed is:

1. A method of forming a perspective rendering from a voxel data set, comprising:
    (a) raycasting at least one ray from a predetermined location into a voxel space, by sampling points along said ray in a space defined by said voxel data set;
    (b) accumulating the effect of opacity along a path of the ray, using opacity values at said sampling points, into a ray storage value;
    (c) associating points along the cast ray with material classes;
    (d) determining if a ray passes from a point in a first material class to a point in a second material class;
    (e) if the ray is determined to pass between material classes, accumulating a lighting contribution of a surface, associated with a boundary between the two classes, into said ray storage value;
    (f) repeating at least (a), (b), (d), and (e) for a plurality of cast rays; and
    (g) forming a perspective rendering from said ray storage values.

2. A method according to claim 1, comprising determining the location of said boundary in (e) during said ray casting.

3. A method according to claim 2, wherein said boundary is set to be at a position between said two points of different classes.

4. A method according to claim 2, wherein said boundary is determined by examining at least one additional sampling point between the two points of different classes.

5. A method according to claim 4, comprising repeating examining sampling points between points of different classes, until a desired precision of boundary determination is achieved.

6. A method according to claim 1, comprising calculating said lighting contribution of the surface during said ray casting.

7. A method according to claim 6, wherein calculating a lighting contribution of the surface comprises determining a normal to said boundary at a point on the boundary.

8. A method according to claim 1, comprising:
    providing an index array indicating for at least some of the voxels of the voxel data set, if a class-boundary does not pass near the voxel.

9. A method according to claim 8, comprising:
    avoiding said determining in (d) if a sampled point has a negative indication in said index array.

10. A method according to claim 8, comprising:
    reusing an opacity value from a previous sampled point, in accumulating the effect of opacity along the ray path, if a sampled point has a negative indication in said index array. indication in said index array.

11. A method according to claim 8, wherein said index array is generated by setting a value indicating a lack of a boundary for all voxels that are surrounded by voxels in a same class.

12. A method according to claim 1, wherein said associated lighting contribution of the surface comprises a surface lighting calculation of said boundary.

13. A method according to claim 1, comprising stopping said ray casting if said accumulated opacity is over a threshold.

14. A method according to claim 1, wherein said sampling points are separated by a step size and wherein said step size is dependent on the opacity value at the sampling points.

15. A method according to claim 14, wherein said step size is always smaller than a voxel cross-section along the path of the cast ray.

16. A method according to claim 14, wherein said step size is dependent on an opacity at a currently sampled point.

17. A method according to claim 14, wherein said step size is dependent on the opacities of neighboring voxels to the currently sampled point.

18. A method according to claim 1, comprising providing a definition of voxel value intervals for each class, prior to said ray casting.

19. A method according to claim 1, wherein the opacity value of at least some of the sampling points is determined by:
    interpolating between voxels near said point; and
    transforming said interpolated voxel value into an opacity value for said point.

20. A method according to claim 19, wherein said interpolation is dependent on a distance between said sampled point and the predetermined location from which the ray casting is performed.

21. A method according to claim 20, wherein said interpolation varies between a cubic interpolation for nearby points and a linear interpolation for far points.

22. A method according to claim 1, wherein said predetermined location is within the voxel space.

23. A method according to claim 1, wherein said voxel data set comprises a medical imaging data set.

24. A method according to claim 1, wherein (f) comprises:
    sparsely casting rays; and
    determining if to cast at least one additional ray between cast rays.

25. A method according to claim 24, wherein determining if to cast said at least one additional ray comprises determining if said neighboring rays to said additional ray are statistically homogeneous.

26. A method according to claim 25, wherein statistical homogeneity is determined with respect to the ray storage values.

27. A method according to claim 25, wherein statistical homogeneity is determined with respect to depth factors associated with the ray.

28. A method according to claim 1, wherein (g) comprises interpolating between stored values of cast rays.

29. A method according to claim 1, wherein (f) comprises progressively increasing the density of raycasting.

30. A method according to claim 29, wherein the progressively cast rays are cast in parallel.

31. A method according to claim 29, wherein additional cast rays are cast to progressively generate nested levels of resolution in the formed image.

32. A method according to claim 1, comprising rendering said formed perspective rendering on a display.

33. A method according to claim 1, comprising defining a window in or near the voxel space through which to cast said rays.

34. A method according to claim 33, wherein said window is perpendicular to a provided orientation vector.

35. A method according to claim 33, wherein said window is flat and rectangular.

36. A method according to claim 33, wherein said window is curved.

37. A method according to claim 33, wherein said window is defined by pixels in a uniformly spaced rectangular grid.

38. A method according to claim 33, wherein said window is defined by pixels using coordinates which are one of circular coordinates, elliptical coordinates and another conic projection of coordinates.

39. A method according to claim 1, wherein said accumulation of opacity comprises updating a storage value CT as follows: $CT=CT*T^{step\_size}$, where T is a transparency value corresponding to the opacity value.

40. A method according to claim 1, wherein said rays are cast in parallel.

41. A method according to claim 1, wherein the voxel data set is generated by one of CT (Computerized Tomography), MRI (Magnetic Resonance Imaging), Ultrasound, a geophysical survey, a meteorological survey, a scientific simulation, an animation model having more than two dimensions and a set of simultaneous equations.

42. A method according to claim 1, wherein each voxel in the voxel data set has associated therewith a visual representation value and comprising:

determining a visualization value associated with a sampled point from the voxel associated visual representation values; and accumulating said point associated visualization value into said stored value.

43. A method according to claim 42, wherein said visual representation value is a gray scale value.

44. A method according to claim 42, wherein said visual representation value is a color value.

45. A method according to claim 42, wherein accumulating said point associated visualization values comprises selectively accumulating values based on front surface detection.

46. A method according to claim 42, wherein said point associated visualization value comprises a volume lighting value.

47. A method according to claim 42, wherein said point associated visualization value comprises a surface lighting value.

48. A method according to claim 1, wherein advancing along a ray is coordinated with an opacification process.

49. Apparatus for forming a perspective rendering from a voxel space including:

a memory for storing a voxel data set;

a computer processor performing the following:

(a) raycast at least one ray from a predetermined location into the voxel space sampling points along said ray in a space defined by said voxel data set;

(b) accumulate the effect of opacity along the ray path, using opacity values at said sampling points, into a ray storage value;

(c) associate points along the cast ray with material classes;

(d) determine if a ray passes from a point in a first material class to a point in a second material class:

(e) if the ray is determined to pass between classes accumulate a lighting contribution of a surface, associated with a boundary between the two classes, into said ray storage value;

(f) repeat at least (a) (b) (d) and (e) for a plurality of cast rays; and (g) form a perspective rendering from said ray storage values; and a second memory for storing said formed perspective rendering.

50. A method according to claim 1, comprising providing at least one association between two different material classes and a lighting contribution of a surface associated with the boundary.

51. A method according to claim 1, wherein determining if a ray passes from a point in a first material class to a point in a second material class, comprises determining using opacity values of the points.

52. A method according to claim 1, wherein the material classes belong to a plurality of possible material classes.

* * * * *